Figure 1:
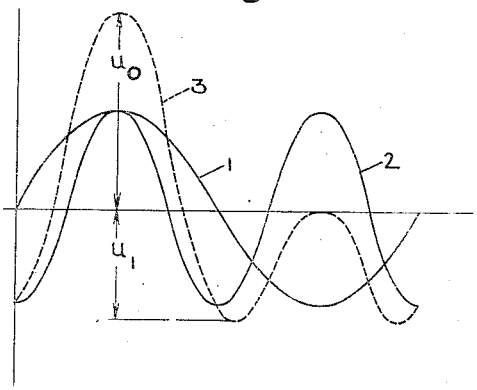

April 19, 1938.  F. HAMACHER  2,114,840
RECTIFIER SYSTEM
Filed Nov. 27, 1935  2 Sheets-Sheet 1

Inventor:
Fritz Hamacher,
by Harry E. Dunham
His Attorney.

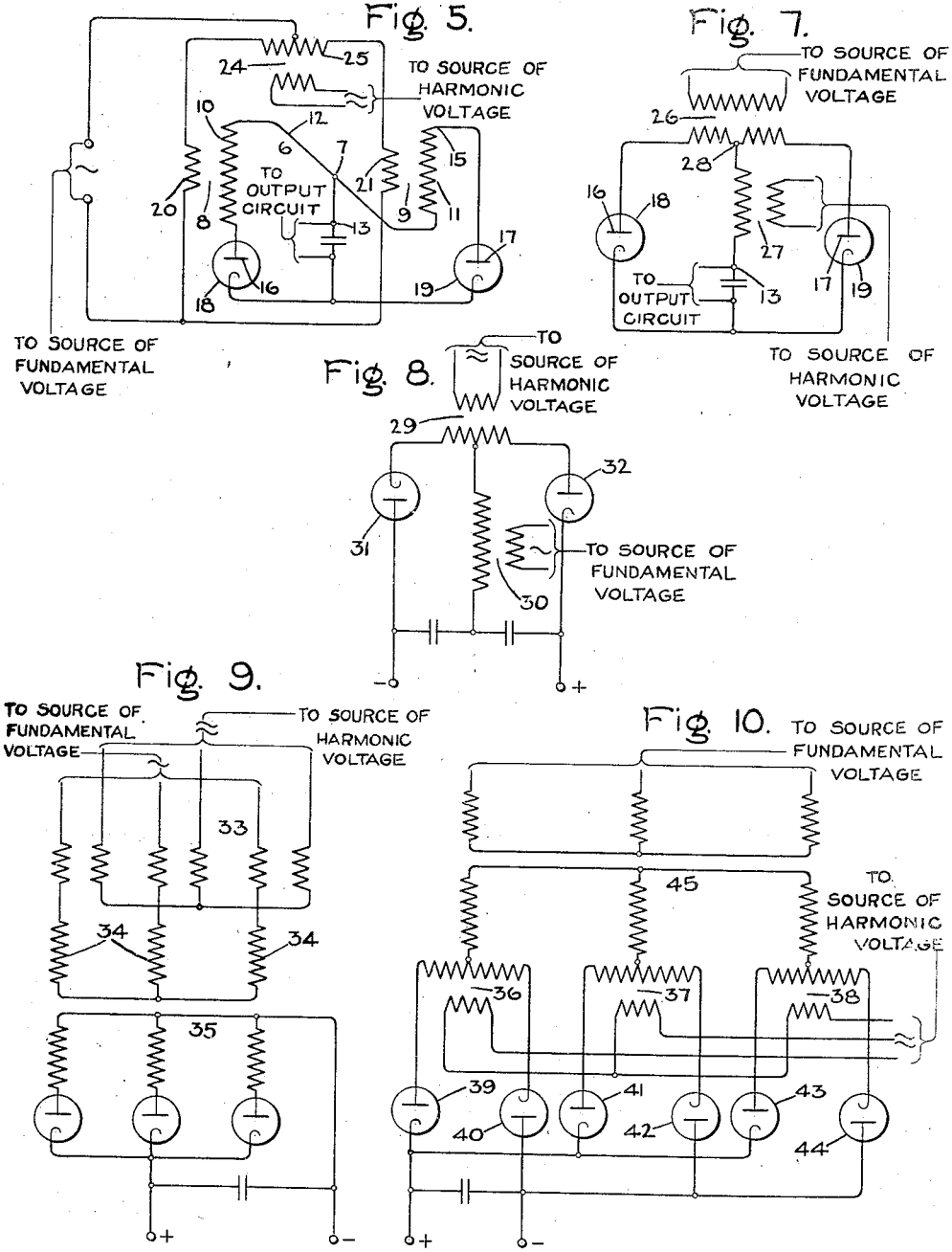

Patented Apr. 19, 1938

2,114,840

UNITED STATES PATENT OFFICE 2,114,840

RECTIFIER SYSTEM

Fritz Hamacher, Berlin-Reinickendorf, Germany, assignor to General Electric Company, a corporation of New York Application November 27, 1935, Serial No. 51,913
In Germany December 12, 1934

8 Claims. (Cl. 175—363)

My invention relates to rectifier systems for converting alternating current at high voltages into direct current, and particularly to methods of and means for reducing the inverse voltage in the discharge paths or rectifier devices of such high voltage rectifier systems relative to the voltage in the conducting direction. The principal object of the invention is to reduce the number of discharge paths or rectifier devices required in a given high voltage rectifier system.

As is well known, discharge paths such as provided by unidirectionally conducting space discharge devices or tubes may be used in the construction of high tension rectifiers designed to rectify currents of very high voltages. If the voltage values which arise are greater than the permissible inverse voltage of the discharge paths, a number of these latter are arranged in series or in suitable cascade modes of connection. Connections or circuits of this kind, however, entail a very large number of discharge paths, when voltages of several hundreds of kilocycles have to be dealt with.

The present invention relates to an arrangement of discharge path stages or devices such that the voltage in the conducting direction across the devices is increased without exceeding the permissible inverse voltage across the devices. This arrangement therefore permits of the production of the very highest possible direct current voltage with the fewest possible number of discharge paths, that is to say, with the fewest possible number of stages, so that in accordance with the invention the construction of rectifiers of this kind is simplified and their cost reduced.

In accordance with the present invention the various transformers are not supplied from a source of current with a purely sine-shaped voltage curve, but with a voltage which is the resultant of a sine-shaped voltage of the fundamental frequency and a sine-shaped voltage of the second harmonic. The amplitude of both voltage components is preferably the same and the phase relationship of the second harmonic with respect to the fundamental or first harmonic is selected in such a way that the peak values of the second harmonic which are positive with respect to the anode of the discharge path connected thereto occur coincidently in each case with the positive or negative peak values of the fundamental or first harmonic. For the connected discharge path, this arrangement, which embodies the idea on which the present invention is based, has a result that the amplitude of the second harmonic is added to the positive amplitude of the fundamental or first harmonic, while the peak value of the negative half of the resultant voltage is approximately equal to the amplitude of the fundamental or first harmonic at the discharge path.

My invention will be better understood from the following description when considered in connection with the accompanying drawings and its scope will be pointed out in the appended claims.

Figure 2:
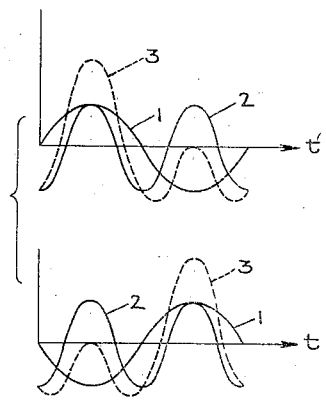
Figure 3:
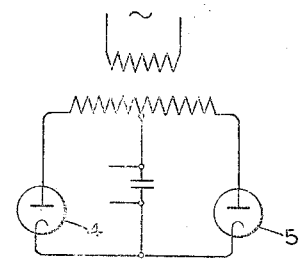
Figure 4:
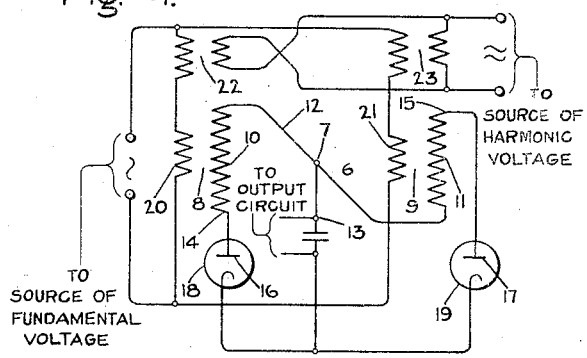
Figure 6:
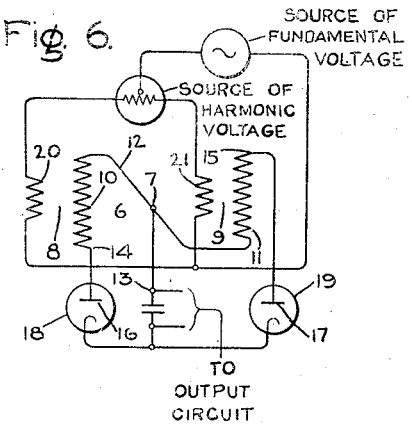

Referring to the drawings, Fig. 1 illustrates graphically the relation to each other of the fundamental voltage, second harmonic voltage, and the resultant voltage; Fig. 2 illustrates necessary voltage relations in the two discharge paths of a full-wave rectifier; Fig. 3 is a circuit diagram of a usual full-wave rectifier shown for the purpose of explaining the mode of operation of the invention; Fig. 4 is a diagrammatic representation of a full-wave rectifier system embodying the invention; Figs. 5, 6 and 7 illustrate embodiments of the invention similar to that of Fig. 4 but of simplified construction; Fig. 8 illustrates diagrammatically an embodiment of my invention in a frequency-multiplier circuit; and Figs. 9 and 10 illustrate diagrammatically embodiments of my invention in polyphase rectifier circuits.

In Fig. 1, which illustrates the combining of the two voltage components to form the resultant voltage, curve 1 shows the fundamental or first harmonic, curve 2 the second harmonic, while curve 3 shows the resultant anode voltage impressed at a discharge path. The resultant positive half wave which determines the production of the output direct current continuous voltage rises to the peak value $u_0$, while the peak value $u_1$ of the resultant negative half wave is about equal to the value of the amplitude of the two component voltages 1 and 2. It is not necessary to keep the amplitudes of the component voltages exactly equal, since if small changes take place in the ratio between the amplitudes, the inverse voltage value is only negligibly affected. The maximum difference at the discharge path during the inverse half period, therefore, has the value $u_0+u_1$. This means that the discharge paths are only loaded to the extent of 1.5 times the value of the direct current voltage instead of with approximately double the value thereof as is the case in the normal arrangements with a sine-shaped anode voltage. Therefore, by utilizing the idea on which this invention is based, at least one out of every four discharge paths and voltage stages can be dispensed with in rectifier systems designed for high voltages.

As will be seen from the voltage curves shown in Fig. 1, the resultant voltage curve obtained in accordance with this invention cannot be used directly, as may a sine-shaped voltage curve, for full wave rectification. On the contrary the superimposed voltage of double frequency for the rectification must be added to one of the half waves of a particular phase winding with a phase which is staggered by 180° compared with the phase in the winding for the rectification of the other half wave. These ratios are diagrammatically shown in Fig. 2, the upper diagram of which shows, for comparison purposes, the same voltage curves as Fig. 1. The resultant voltage (curve 3) of the upper diagram in Fig. 2 is assumed to be the voltage which would be required at the discharge path 4 in the full-wave rectifier system shown for illustrative purposes in Fig. 3. The discharge path 5, however, must, in order to obtain symmetrical action of the full-wave rectifier, be supplied with a voltage such as is shown by the curve 3 in the lower diagram in Fig. 2. The positive and negative directions of the voltage are shown respectively with respect to the corresponding discharge paths, from which it immediately appears that the voltages 1 in the upper and lower diagrams of Fig. 2 are the same, while, referring to the frequency of the voltage 2, the voltage 2 in the lower diagram is staggered 180° in phase as compared with the voltage 2 in the upper diagram.

A suitable combining of the two voltages to form the resultant voltage can be obtained in different ways. Fig. 4 shows a constructional example of such a voltage stage operating in double rectifier circuits. The transformer 6 having the central tap 7, with which it is normally provided, is divided into two single step-up transformers 8 and 9. The secondary windings 10, 11 of these two transformers are connected in series. The connecting conductor 12 is connected to one output direct current pole 13 and the free ends 14, 15 of the secondaries are connected to the anodes 16, 17 of the discharge paths 18 and 19 respectively, shown for purposes of illustration as hot cathode space discharge devices or tubes. The two primary windings 20, 21 of the transformers 8 and 9 are connected in parallel with the voltage source for the fundamental or first harmonic, the secondary windings of two transformers 22 and 23 respectively being connected in series with each of the primary windings 20, 21. The transformers 22 and 23 transmit the additional voltage of double frequency, and in such a way that the mutual phase relationship of the voltages as shown in Fig. 2 is obtained in the two transformers 8 and 9.

The constructional examples shown in Figs. 5 and 6 serve the same purpose as in the arrangement shown in Fig. 4 but attain it by a somewhat simpler construction. In Fig. 5 separate transformers 8 and 9 are provided as in Fig. 4 for supplying the discharge paths 18 and 19. The additional voltage is, however, supplied by a single transformer 24, the secondary winding 25 of which is tapped centrally.

Fig. 7 permits of a further simplification, namely the use of a centrally tapped main step-up transformer 26. This is made possible by supplying the additional voltage of double frequency on the higher voltage side of transformer 26. For this purpose the secondary winding of the additional transformer 27 is connected up in series with the output direct current circuit and to the central tap 28 of the transformer 26 for the fundamental or first harmonic.

Referring again to the constructional form shown in Fig. 6, it is true that in this latter figure the transformer 6 for the fundamental or first harmonic is divided into two transformers 8 and 9 as in Figs. 4 and 5, but a separate transmitting transformer for the voltage of double frequency is avoided by providing the source of voltage of double frequency with a central tap and connecting this source directly to the primary windings of the transformers 8 and 9.

The invention can be applied not only in simple half-wave or full-wave rectifier arrangements but also by way of example in frequency multiplier circuits.

Fig. 8 shows as a constructional example a frequency multiplier circuit according to Greinacher. The additional voltage of double frequency may with advantage be supplied across a centrally tapped step-up transformer 29. The central tap of this transformer, which is placed on the high tension side, is connected to the secondary winding of the main transformer 30, while the opposite terminals of the additional transformer 29 are connected to the cathode of the discharge path 31 and to the anode of the discharge path 32 respectively.

The other constructional examples, shown in Figs. 9 and 10, show the possibility of using the idea on which this invention is based for polyphase rectifier arrangements. The additional voltage of double frequency must be supplied to the rectifier in three phase form. In the three phase rectifier shown in Fig. 9 the three phase additional transformer 33 is interposed for this purpose in series with the primary windings 34 of the main transformer 35. In the three phase Graetz rectifier shown in Fig. 10 the voltages of the fundamental or first harmonic and of the second harmonic may with advantage be combined on the higher voltage side. For this purpose three additional transformers 36, 37 and 38, with centrally tapped secondary windings may be provided. The secondary winding is connected in each case to the anode or the cathode of the pairs of discharge paths 39, 40, 41, 42 and 43, 44, each pair of discharge paths being connected to a phase of the fundamental voltage, while the central tap is connected to the corresponding end of the secondary winding of the main transformer 45. The windings of the additional transformers 36, 37, 38 may be arranged on a common, multiple limbed iron core, whereby the construction will be simplified under certain circumstances.

In this manner it is always possible to combine the fundamental and the additional or harmonic voltages according to the idea upon which the present invention is based, and thereby to insure the desired higher value of the inverse voltage compared with the direct current output voltage.

My invention has been described herein in particular embodiments for purposes of illustration. It is to be understood, however, that the invention is susceptible of various changes and modifications, and that by the appended claims I intend to cover any such modifications as fall within the true spirit and scope of my invention.

What I claim as new and desire to secure by Letters Patent in the United States is:

1. In an electric system, the combination with rectifier apparatus comprising unidirectionally conducting discharge devices and means to supply a sine-wave voltage of fundamental frequency to said discharge devices, of means to increase the voltage in the conducting direction across said devices during the normal operation of said system without causing the maximum permissible inverse voltage across said devices to be exceeded, said means comprising means to supply thereto a sine-wave voltage of double the frequency of said fundamental, said voltages being of substantially the same amplitude, the phase relationship of said voltages being such that the peak values of said voltages substantially coincide in point of time, the double-frequency voltage being added to the positive half-waves of the fundamental and subtracted from the negative half-waves of the fundamental.

2. In an electric system, the combination with rectifier apparatus comprising unidirectionally conducting discharge devices and means including a transformer to supply a sine-wave voltage of fundamental frequency to said discharge devices, of means to increase the voltage in the conducting direction across said devices during the normal operation of said system without causing the maximum permissible inverse voltage across said devices to be exceeded, said means comprising means to introduce into the circuit of lower voltage of said supply transformer a sine-wave voltage of double the frequency of said fundamental, said fundamental and double-frequency voltages being of substantially the same amplitude, the phase relationship of said last-named voltages being such that their peak values coincide in point of time, the double-frequency voltage being added to the positive half-waves of the fundamental and subtracted from the negative half-waves of the fundamental.

3. In an electric system, rectifier apparatus comprising at least one pair of discharge paths arranged for full-wave rectification, a source of sine-wave voltage of fundamental frequency, means to supply said voltage to said pair including two separate transformers having their secondaries connected in series and having their primaries connected in parallel with said source, a source of sine-wave voltage of double the frequency of said fundamental, and means comprising additional windings in series with said primaries to supply said double-frequency voltage to said pair of discharge paths, said double frequency voltage being added to the positive half-waves of the fundamental and subtracted from the negative half-waves of said fundamental.

4. In an electric system, the combination with a rectifier apparatus comprising a pair of discharge paths and means including a pair of transformers to supply a sine-wave voltage of fundamental frequency to said discharge paths, of means to reduce the inverse voltage across said discharge paths relative to the voltage across said path in the conducting direction comprising means including a pair of additional transformers to supply to said discharge paths a sine-wave voltage of double the frequency of said fundamental, said voltages being of substantially the same amplitude, said voltages being so phased that the peak values thereof substantially coincide in point of time, said double-frequency voltage being added to the positive half-waves of the fundamental and subtracted from the negative half-waves of said fundamental.

5. In an electric system, the combination with a rectifier apparatus comprising a pair of discharge paths and means including a source of voltage of fundamental frequency and a pair of transformers to supply a sine-wave of said fundamental frequency to said discharge paths, of means to reduce the inverse voltage across said discharge paths relative to the voltage across said paths in the conducting direction comprising means to supply to said discharge paths a sine-wave voltage of double the frequency of said fundamental, said double frequency voltage being added to the positive half-waves of the fundamental and subtracted from the negative half-waves of said fundamental, said last-named means including a source of said double-frequency voltage and a winding associated with said source and connected in series between the primaries of said transformers, said winding having a mid-tap connected to said source of voltage of fundamental frequency.

6. In an electric system, the combination with rectifier apparatus comprising unidirectionally conducting discharge devices and means including a transformer to supply a sine-wave voltage of fundamental frequency to said discharge devices, of means to increase the voltage in the conducting direction across said devices during the normal operation of said system without causing the maximum permissible inverse voltage across said devices to be exceeded, said means comprising means to introduce into the circuit of higher voltage of said transformer a sine-wave voltage of double the frequency of the fundamental and of substantially the same amplitude as said fundamental, said voltages being so phased that the peak values thereof substantially coincide in point of time, said double-frequency voltage being added to the positive half-waves and subtracted from the negative half-waves of the fundamental.

7. In an electric system, the combination with rectifier apparatus comprising unidirectionally conducting discharge devices, means including a transformer to supply a sine-wave voltage of fundamental frequency to said discharge devices, and a direct current output circuit connected to said discharge devices, of means to increase the voltage in the conducting direction across said devices without causing the maximum permissible inverse voltage across said devices to be exceeded, said means comprising means to introduce into the circuit of higher voltage of said transformer a sine-wave voltage of double the frequency of the fundamental, said last-named means including a source of voltage of said double-frequency and a winding associated with said source and connected in series in said output circuit, said double frequency voltage being added to the positive half-waves of the fundamental and subtracted from the negative half-waves of said fundamental.

8. In an electric system, the combination with rectifier apparatus comprising a pair of unidirectionally conducting discharge devices and means including a transformer to supply a sine-wave voltage of fundamental frequency to said discharge devices, of means to increase the voltage in the conducting direction across said devices without causing the maximum permissible inverse voltage across said devices to be exceeded, said second-named means comprising a source of voltage of double the frequency of the fundamental and an additional transformer connected to said source, said additional transformer having a secondary winding connected at its terminals to said discharge devices and a mid-tap connected to the secondary of said first-named transformer, said double frequency voltage being added to the positive half-waves of the fundamental and subtracted from the negative half-waves of said fundamental.

FRITZ HAMACHER.